Feb. 3, 1925.

S. E. PERKINS 1,524,951

TIRE CHAIN FASTENER

Filed Feb. 25, 1924

INVENTOR
Silas E. Perkins
BY J. L. Rivers.
ATTORNEY

Patented Feb. 3, 1925.

1,524,951

UNITED STATES PATENT OFFICE.

SILAS E. PERKINS, OF WINLOCK, WASHINGTON.

TIRE-CHAIN FASTENER.

Application filed February 25, 1924. Serial No. 694,851.

*To all whom it may concern:*

Be it known that I, SILAS E. PERKINS, a citizen of the United States, residing at Winlock, in the county of Lewis and State of Washington, have invented a new and useful Tire-Chain Fastener, of which the following is a specification.

The tire-chain fasteners commonly in use are fixedly attached to the chain and do not afford conveniently adjustable means for supplying the tension desirable for mounting the chain on the tire, or taking up the slack incident to use of the chain.

The objects of my invention are, to obviate these difficulties, and in furtherance thereof I provide a fastener which can be detachably connected with any tire-chain, and through its adjustable features the requisite tension can be supplied, not only in mounting the chain on the tire but in maintaining it thereon in complete, operative position.

In the accompanying drawing—

Figure 1:
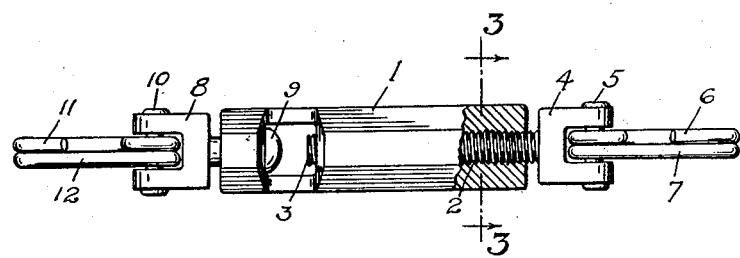
Figure 1 is a view, partly in section, of the entire device.
Figure 3:
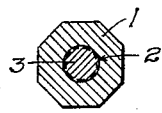

Fig. 3, a cross section, drawn on the line 3—3, of Fig. 1.

Referring more particularly to the drawing, the body 1 is preferably octagonal in cross section, as is more fully shown in Fig. 3, thus affording a secure handhold for the user, and also a surface to which a wrench can be operatively secured. 2 denotes an interiorly threaded section extending longitudinally of the body. A bolt-like member 3, having a stirrup shaped head 4 carrying the pin 5, is exteriorly threaded and adapted to engage the threaded portion of the body to the extent indicated in Fig. 1. A pair of opposed hooks 6 and 7 are swingingly mounted on the pin 5 and designed to engage a link at a free end of a tire chain.

The other end of the body is provided with a swiveled connection, comprising the stirrup shaped link 8, the swivel bolt 9, and the pin 10. A pair of opposed hooks 11 and 12 are swingingly mounted on the pin 10 and, as is evident, are for the purpose of engaging a link of the chain located oppositely of the one engaged by the first pair.

Figure 2:
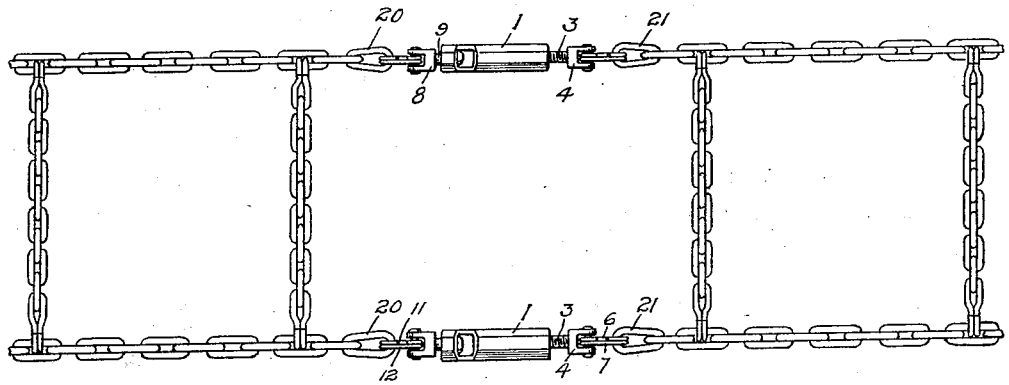
Fig. 2, is a view of a pair of the fasteners as mounted to and securing the free ends of a tire-chain.

After a chain has been placed on a tire in condition to be secured thereon, a pair of the fasteners are hooked on to the free ends of the chain designated 20 and 21, in Fig. 2. Obviously, by turning the body 1, either with the hand or a wrench, the required tension can readily be applied to the chain by reason of the threaded connection with the bolt-like member at one end and the swiveled connection at the other. Each hook of a pair, being disposed in opposed relation with the other, permits each pair to hold its aforesaid link against lateral displacement, and as the end of each hook, when in operative position, lies parallel with the body of the adjacent hook, no sharp points are presented which might in any manner injure the tire. The form of the body is such as to prevent it from turning when lying against the tire and under tension unless considerable force would be exerted against it, as, for instance, the application of a wrench. Should the chain become loose at any time, through usage, it can be easily tightened up as required, and in the manner indicated.

The device is simple and effective, and fills a want in that it is detachable and adjustable, and can be quickly applied to or demounted from any tire-chain.

As will be obvious to those skilled in the art, changes in and modifications of the construction described may be made without departing from the spirit of my invention or sacrificing its advantages.

I claim:

1. A tire-chain fastener, comprising a body portion angular in cross section, a pair of opposed hooks swiveled to one end of the portion, a supporting member, having an integral exteriorly threaded body section in threaded engagement with the other end of the portion, and a pair of opposed hooks swingingly mounted to the outer end of the member.

2. A tire-chain fastener, comprising a body portion, an axial bore-like opening interiorly threaded, disposed in one end of the portion and extending longitudinally thereof, a bolt-like member having an integral exteriorly threaded body section, adapted to threadedly engage the opening, a bifurcated head for the member, a pair of opposed hooks hingedly mounted in the head, a swiveled connection disposed at the other end of the portion, and a pair of opposed hooks hingedly mounted therein.

3. A tire-chain fastener comprising an elongated body portion polygonal in cross section, a member, in threaded engagement with one end of the portion, having a bifurcated head, a pin mounted transversely in the head, a pair of opposed hooks swingingly mounted on the pin, a swiveled connection disposed at the other end of the portion comprising a swivel bolt, a stirrup shaped link and a pin mounted transversely in the link, and a pair of opposed hooks swingingly mounted on the last-named pin.

SILAS E. PERKINS.